US012562060B2

(12) United States Patent
Kaneko et al.

(10) Patent No.: US 12,562,060 B2
(45) Date of Patent: Feb. 24, 2026

(54) INFORMATION NOTIFICATION DEVICE AND INFORMATION NOTIFICATION METHOD

(71) Applicant: TOYOTA JIDOSHA KABUSHIKI KAISHA, Toyota (JP)

(72) Inventors: Tomohiko Kaneko, Yokohama (JP); Junichi Morimura, Shizuoka-ken (JP); Shun Maruyama, Numazu (JP); Ryoma Hiraike, Toyota (JP); Satoshi Omi, Ebina (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 18/589,657

(22) Filed: Feb. 28, 2024

(65) Prior Publication Data

US 2024/0379003 A1     Nov. 14, 2024

(30) Foreign Application Priority Data

May 10, 2023     (JP) ................................. 2023-078014

(51) Int. Cl.
| | |
|---|---|
| *G08G 1/16* | (2006.01) |
| *B60W 50/02* | (2012.01) |
| *B60W 50/14* | (2020.01) |

(52) U.S. Cl.
CPC ......... *G08G 1/162* (2013.01); *B60W 50/0205* (2013.01); *B60W 50/14* (2013.01); *G08G 1/166* (2013.01); *B60W 2050/146* (2013.01); *B60W 2540/223* (2020.02); *B60W 2556/65* (2020.02)

(58) Field of Classification Search
None
See application file for complete search history.

(56) References Cited

U.S. PATENT DOCUMENTS

| | | | |
|---|---|---|---|
| 9,964,950 | B2 | 5/2018 | Takano |
| 10,017,116 | B2 | 7/2018 | Sato |
| 10,310,508 | B2 | 6/2019 | Kunisa et al. |
| 10,452,930 | B2 | 10/2019 | Sato |
| 10,663,973 | B2 | 5/2020 | Hashimoto et al. |
| 10,895,875 | B2 | 1/2021 | Hashimoto et al. |
| 11,001,198 | B2 | 5/2021 | Morimura et al. |
| 11,275,382 | B2 | 3/2022 | Hashimoto et al. |
| 2016/0121791 | A1 | 5/2016 | Shimizu |
| 2020/0223352 | A1* | 7/2020 | Toshio Kimura ...... B60Q 1/547 |
| 2020/0231087 | A1* | 7/2020 | Morimura ................ B60Q 1/52 |

(Continued)

FOREIGN PATENT DOCUMENTS

| | | |
|---|---|---|
| JP | 2011-253486 A | 12/2011 |
| JP | 2013-120574 A | 6/2013 |

(Continued)

*Primary Examiner* — Arslan Azhar
(74) *Attorney, Agent, or Firm* — SoraIP, Inc.

(57) ABSTRACT

The information notification device includes a failure information detection unit that detects failure information that affects traveling of the host vehicle when the host vehicle is traveling, and a notification control unit that notifies the succeeding vehicle of at least one of the failure information and the behavior information related to the behavior of the host vehicle caused by the failure information via a display provided in the host vehicle so as to be visually recognized from the succeeding vehicle located behind the host vehicle.

10 Claims, 8 Drawing Sheets

(56)     References Cited

U.S. PATENT DOCUMENTS

2021/0229598  A1      7/2021  Morimura et al.
2021/0380124  A1     12/2021  Urano et al.
2025/0006059  A1*     1/2025  Seki ...................... G08G 1/166

FOREIGN PATENT DOCUMENTS

JP        2017-174449  A      9/2017
JP        2022-160149  A     10/2022

* cited by examiner

Figure 1:
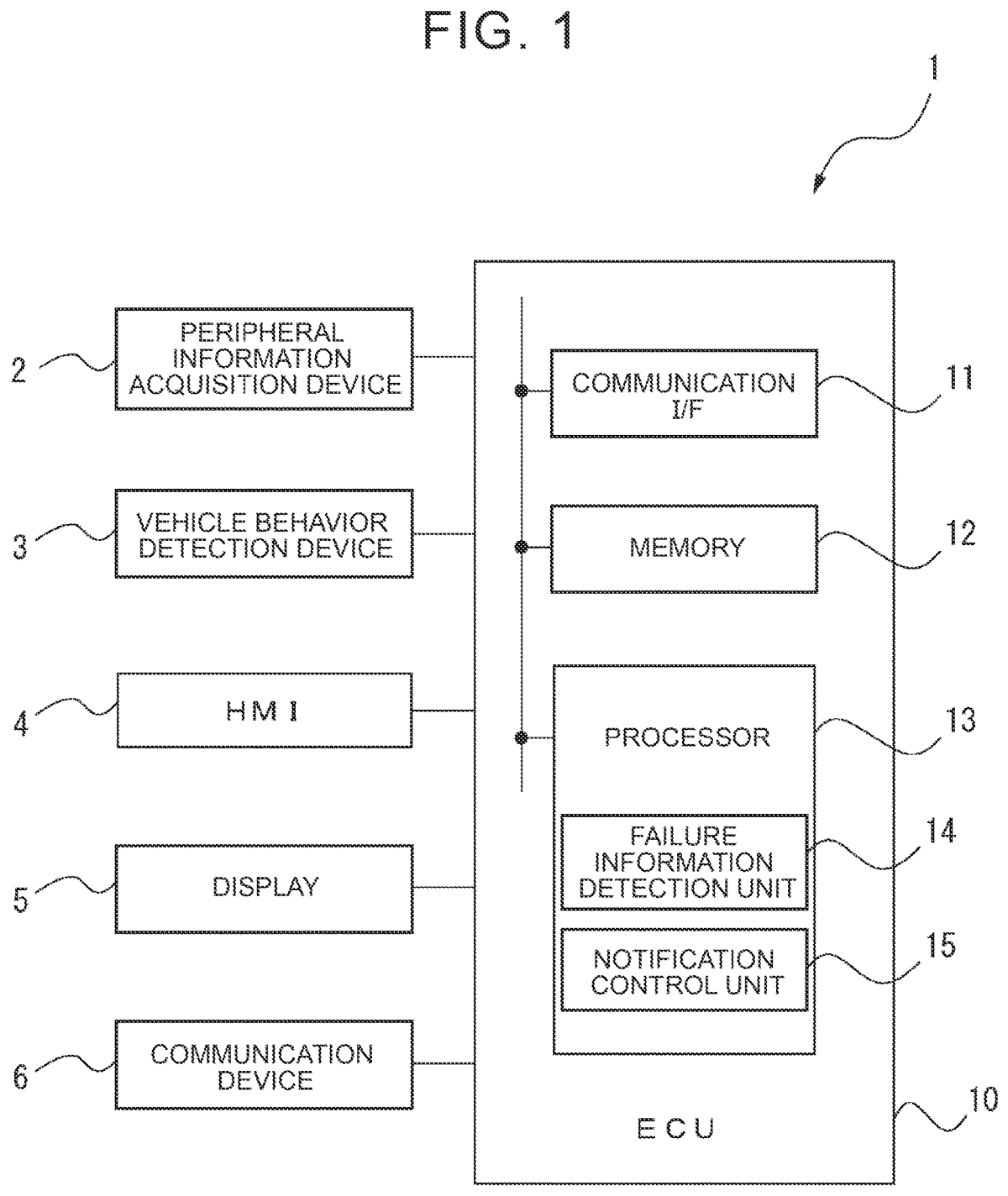

| PERIPHERAL INFORMATION ACQUISITION DEVICE | 2 |

| VEHICLE BEHAVIOR DETECTION DEVICE | 3 |

| HMI | 4 |

| DISPLAY | 5 |

| COMMUNICATION DEVICE | 6 |

COMMUNICATION I/F — 11

MEMORY — 12

PROCESSOR — 13

FAILURE INFORMATION DETECTION UNIT — 14

NOTIFICATION CONTROL UNIT — 15

ECU — 10

INFORMATION NOTIFICATION DEVICE AND INFORMATION NOTIFICATION METHOD

CROSS-REFERENCE TO RELATED APPLICATION

This application claims priority to Japanese Patent Application No. 2023-078014 filed on May 10, 2023, incorporated herein by reference in its entirety.

BACKGROUND

1. Technical Field

The present disclosure relates to an information notification device and an information notification method.

2. Description of Related Art

Japanese Unexamined Patent Application Publication No. 2017-174449 (JP 2017-174449 A) describes informing a pedestrian positioned ahead of a host vehicle and a following vehicle positioned behind the host vehicle of a danger of a collision between the pedestrian and the following vehicle using a danger informing unit (e.g. a headlight, a horn, etc.) mounted on the host vehicle for use different from the use of indicating a danger when there is a danger of a collision between the pedestrian and the following vehicle.

Japanese Unexamined Patent Application Publication No. 2013-120574 (JP 2013-120574 A) describes displaying information on a pedestrian blocked by a parked vehicle positioned ahead of a host vehicle (an icon of the pedestrian and the time before the pedestrian is visually recognized) on a human-machine interface (HMI) of the host vehicle when such a pedestrian is detected through pedestrian-to-vehicle communication.

SUMMARY

In the technique described in JP 2017-174449 A, light or sound is emitted from the host vehicle to the following vehicle. Since the notification does not include a specific content, however, the driver of the following vehicle may not be able to grasp the meaning of the notification. In the technique described in JP 2013-120574 A, meanwhile, it is not intended to notify the following vehicle of information from the host vehicle.

In view of the above issues, an object of the present disclosure is to provide information in an easily understandable manner from a host vehicle to a following vehicle when the host vehicle is traveling.

The gist of the present disclosure is as follows.

(1) An information notification device including: a failure information detection unit that detects failure information that affects travel of a host vehicle when the host vehicle is traveling; and a notification control unit that notifies a following vehicle positioned behind the host vehicle of at least one of the failure information and behavior information relating to behavior of the host vehicle caused by the failure information via a display provided in the host vehicle so as to be visually recognized from the following vehicle.

(2) The information notification device according to (1), further including a driver position detection unit that detects a position of a driver of the following vehicle, in which:

the display includes a plurality of display units disposed at different positions in the host vehicle; and the notification control unit changes a display position of the at least one of the failure information and the behavior information on the display according to the position of the driver of the following vehicle when the following vehicle is notified of the at least one of the failure information and the behavior information.

(3) The information notification device according to (2), in which when a level of a risk caused to the following vehicle based on the failure information is high, the notification control unit increases a number of the display units on which the at least one of the failure information and the behavior information is displayed as compared with when the level of the risk is low.

(4) The information notification device according to any one of (1) to (3), in which the notification control unit notifies the following vehicle of information on a change of a course of the host vehicle via the display when the host vehicle changes its course according to the failure information.

(5) The information notification device according to any one of (1) to (4), in which the notification control unit determines recommended operation of the following vehicle based on the failure information, and notifies the following vehicle of the recommended operation via the display.

(6) An information notification method to be executed by a computer, the information notification method including:

detecting failure information that affects travel of a host vehicle when the host vehicle is traveling; and notifying a following vehicle positioned behind the host vehicle of at least one of the failure information and behavior information relating to behavior of the host vehicle caused by the failure information via a display provided in the host vehicle so as to be visually recognized from the following vehicle.

According to the present disclosure, it is possible to provide information in an easily understandable manner from a host vehicle to a following vehicle when the host vehicle is traveling.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 1 is a diagram schematically showing a part of a configuration of a vehicle provided with an information notification device according to a first embodiment of the present disclosure;

DETAILED DESCRIPTION OF EMBODIMENTS

Figure 2:
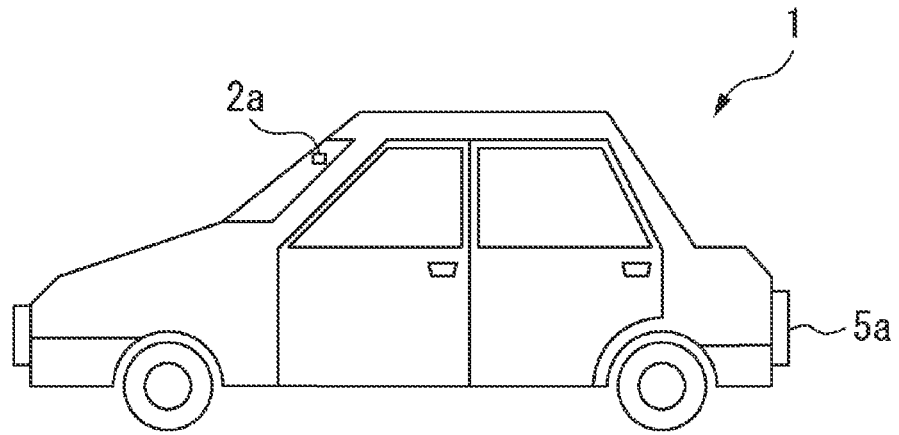
FIG. 2 is a schematic side view of a vehicle.

Hereinafter, an embodiment of the present disclosure will be described below with reference to the drawings. In the following description, similar components are given the same reference numbers.

First Embodiment

Hereinafter, a first embodiment of the present disclosure will be described with reference to FIGS. 1 to 6. FIG. 1 is a diagram schematically illustrating a part of a configuration of a vehicle 1 provided with an information notification device according to a first embodiment of the present disclosure.

As illustrated in FIG. 1, the vehicle 1 includes a peripheral information acquisition device 2, a vehicle behavior detection device 3, a Human Machine Interface (HMI) 4, a display 5, a communication device 6, and an Electronic Control Unit (ECU) 10. The peripheral information acquisition device 2, the vehicle behavior detection device 3, HMI 4, the display 5, and the communication device 6 are electrically connected to ECU 10 via an in-vehicle network or the like compliant with standards such as Controller Area Network (CAN).

The peripheral information acquisition device 2 acquires data (image, point group data, and the like) around the vehicle 1 (host vehicle) as peripheral information of the vehicle 1. For example, the peripheral information acquisition device 2 includes a millimeter-wave radar, a camera (monocular camera or stereo camera), a Laser Imaging Detection And Ranging (LIDAR, an ultrasonic sensor (sonar), or any combination thereof. The peripheral information acquisition device 2 outputs, that is, the peripheral information of the vehicle 1 acquired by the peripheral information acquisition device 2 is transmitted to ECU 10.

FIG. 2 is a schematic side view of the vehicle 1. As shown in FIG. 2, the vehicle 1 is provided with a front-camera 2a. The front camera 2a is disposed at a front portion of the vehicle 1 (for example, a rear surface of a room mirror in the vehicle cabin 1, a front bumper, or the like) so as to capture an image of the front of the vehicle 1. The front-camera 2a captures an image of the front of the vehicle 1 and generates an image of the front of the vehicle 1. The front-camera 2a is an exemplary peripheral information acquisition device 2.

The vehicle behavior detection device 3 detects a parameter indicating the behavior of the vehicle 1. The vehicle behavior detection device 3 includes, for example, a vehicle speed sensor (for example, a wheel speed sensor) that detects the speed of the vehicle 1, a yaw rate sensor that detects the yaw rate of the vehicle 1, a brake pedal stroke sensor that detects the depression force of the brake pedal of the vehicle 1, a steering angle sensor that detects the steering angle of the steering of the vehicle 1, and the like. The output of the vehicle behavior detection device 3, that is, the parameter detected by the vehicle behavior detection device 3 is transmitted to ECU 10.

HMI 4 is provided in the vehicle cabin and exchanges data between the vehicle 1 and an occupant (for example, a driver) of the vehicle 1. HMI 4 includes an output unit (for example, a display, a speaker, a light source, a vibrating unit, and the like) that provides information to an occupant of the vehicle 1, and an input unit (for example, a touch panel, an operation button, an operation switch, a microphone, and the like) to which information is input by the occupant of the vehicle 1. The output of ECU 10 is notified to the occupant of the vehicle 1 via HMI 4, and the input from the occupant of the vehicle 1 is transmitted to ECU 10 via HMI 4. HMI 4 may be an input device, an output device, or an input/output device. Note that a mobile terminal (smart phone, tablet terminal, or the like) of the occupant of the vehicle 1 may be connected to ECU 10 so as to be able to communicate with each other by wire or wirelessly, and may function as an HMI 4.

The display 5 is provided in the vehicle 1 so as to be visually recognized by a subsequent vehicle located behind the vehicle 1. In this specification, the following vehicle means a vehicle that travels behind the vehicle 1 in the same lane as the vehicle 1. The output of ECU 10 is notified to the subsequent vehicles via the display 5. As shown in FIG. 2, the vehicle 1 is provided with a rear display 5a. The rear display 5a is arranged at the rear of the vehicle 1 (e.g., above the license plate and between the tail lamps) and displays the data towards the rear of the vehicle 1. The rear display 5a is an exemplary display 5. The display 5 may be provided at the top of the vehicle 1. In addition, the display 5 may be provided in the vehicle cabin as long as it can be visually recognized from the following vehicle.

The communication device 6 is capable of communicating with the outside of the vehicle 1, and is capable of communicating between the vehicle 1 and the outside of the vehicle 1. For example, the communication device 6 includes a wide area communication device that enables wide area wireless communication between the vehicle 1 and the outside of the vehicle 1 (for example, a server) via a communication network such as a carrier network or an Internet network, an inter-vehicle communication device that enables inter-vehicle communication between the vehicle 1 and the surrounding vehicle using a predetermined frequency band, and a road-to-vehicle communication device that enables road-to-vehicle communication between the vehicle 1 and the roadside device using a predetermined frequency band.

ECU 10 executes various controls of the vehicle 1. As shown in FIG. 1, ECU 10 includes a communication interface 11, a memory 12, and a processor 13. The communication interface 11 and the memory 12 are connected to the processor 13 via a signal line. In the present embodiment, one ECU 10 is provided, but a plurality of ECU may be provided for each function.

The communication interface 11 has interface circuitry for connecting ECU 10 to the in-vehicle networking. ECU 10 is connected to other in-vehicle devices via the communication interface 11.

The memory 12 has, for example, a volatile semiconductor memory and a non-volatile semiconductor memory. The memory 12 stores programs, data, and the like used when various kinds of processing are executed by the processor 13.

The processor 13 comprises one or more Central Processing Unit (CPU) and its peripheral circuitry. The processor 13 may further have an arithmetic circuit such as a logic operation unit or a numerical operation unit.

Figure 3:
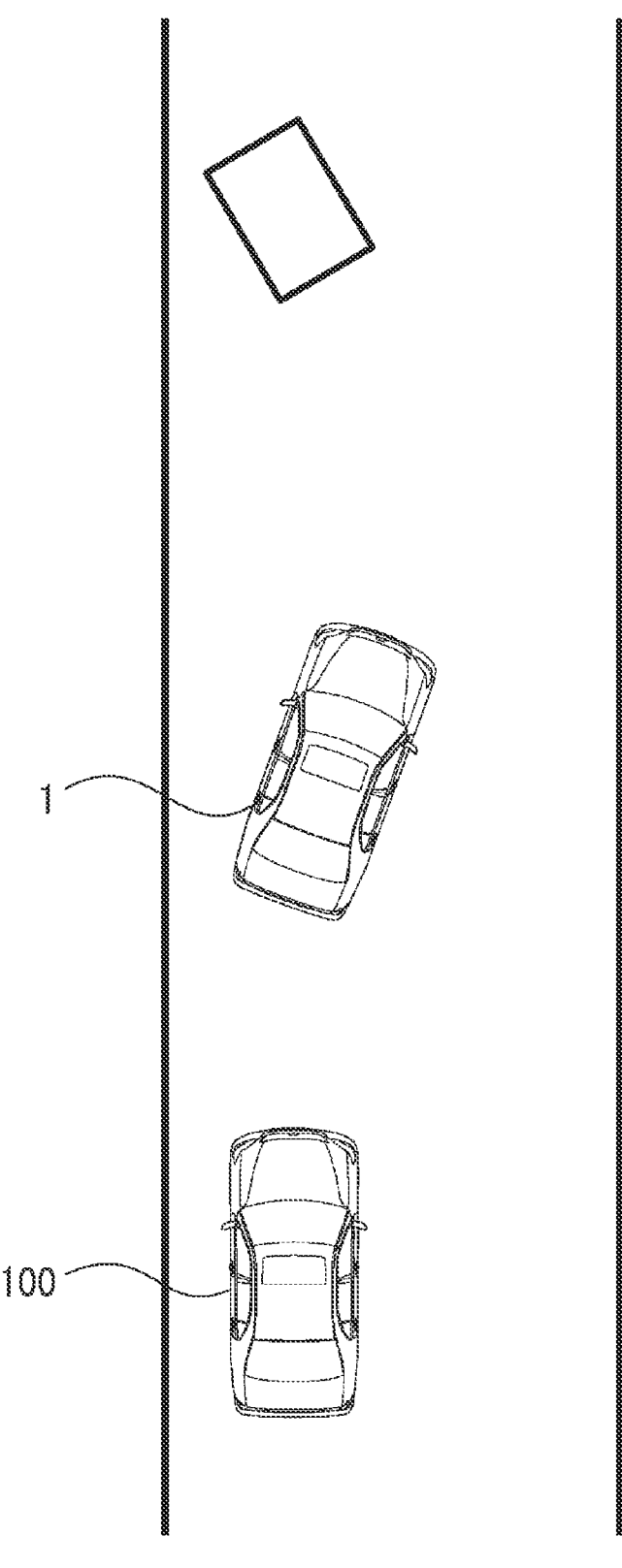
FIG. 3 is a diagram illustrating an example of a situation in which a falling object exists in front of a vehicle.

FIG. 3 is a diagram illustrating an example of a situation in which a falling object exists in front of the vehicle 1. In the example of FIG. 3, when the following vehicle 100 is traveling behind the vehicle 1, the vehicle 1 moves to the right to avoid a falling object. In such a situation, the driver of the following vehicle 100 cannot visually recognize the falling object in front of the vehicle 1, and there is a possibility that a danger occurs in the following vehicle 100. Therefore, in the present embodiment, ECU 10 functions as an information notification device that notifies the following vehicle of the visual information, and notifies the following vehicle 100 of the failure information that affects the travel of the vehicle 1.

As illustrated in FIG. 1, in the present embodiment, the processor 13 of ECU 10 includes a failure information detection unit 14 and a notification control unit 15. The failure information detection unit 14 and the notification control unit 15 are functional modules realized by ECU 10 processor 13 executing programs stored in the memory 12 of ECU 10. These functional modules may be realized by dedicated arithmetic circuits provided in the processor 13.

The failure information detection unit 14 detects failure information (hereinafter, simply referred to as "failure information") that affects the travel of the vehicle 1 when the vehicle 1 is traveling. For example, the failure information detection unit 14 detects, as the failure information, a falling object, a failed vehicle, an accident site, a construction site, lane restriction information, and the like based on the peripheral information acquired by the peripheral information acquisition device 2. In this case, the failure information detection unit 14 detects the failure information using an image recognition technique such as a machine learning model (for example, a neural network, a support vector machine, a random forest, or the like). Further, the failure information detection unit 14 may detect the slip of the road surface as the failure information on the basis of the output of the wheel speed sensor of the vehicle behavior detection device 3 or the like.

The notification control unit 15 controls the display 5 to control notification by the display 5. Normally, it is difficult to grasp a situation in front of the vehicle 1 from a subsequent vehicle located behind the vehicle 1. Therefore, the notification control unit 15 notifies the following vehicle of the information via the display 5. Specifically, the notification control unit 15 notifies the following vehicle of the failure information detected by the failure information detection unit 14 via the display 5. By notifying the following vehicle of the information via the display 5 on which the characters or images are displayed, the information can be easily conveyed from the vehicle 1 to the following vehicle when the vehicle 1 is traveling. Further, by notifying the succeeding vehicle of the failure information, the risk of causing the succeeding vehicle to be caused by the failure information can be reduced.

Figure 4:
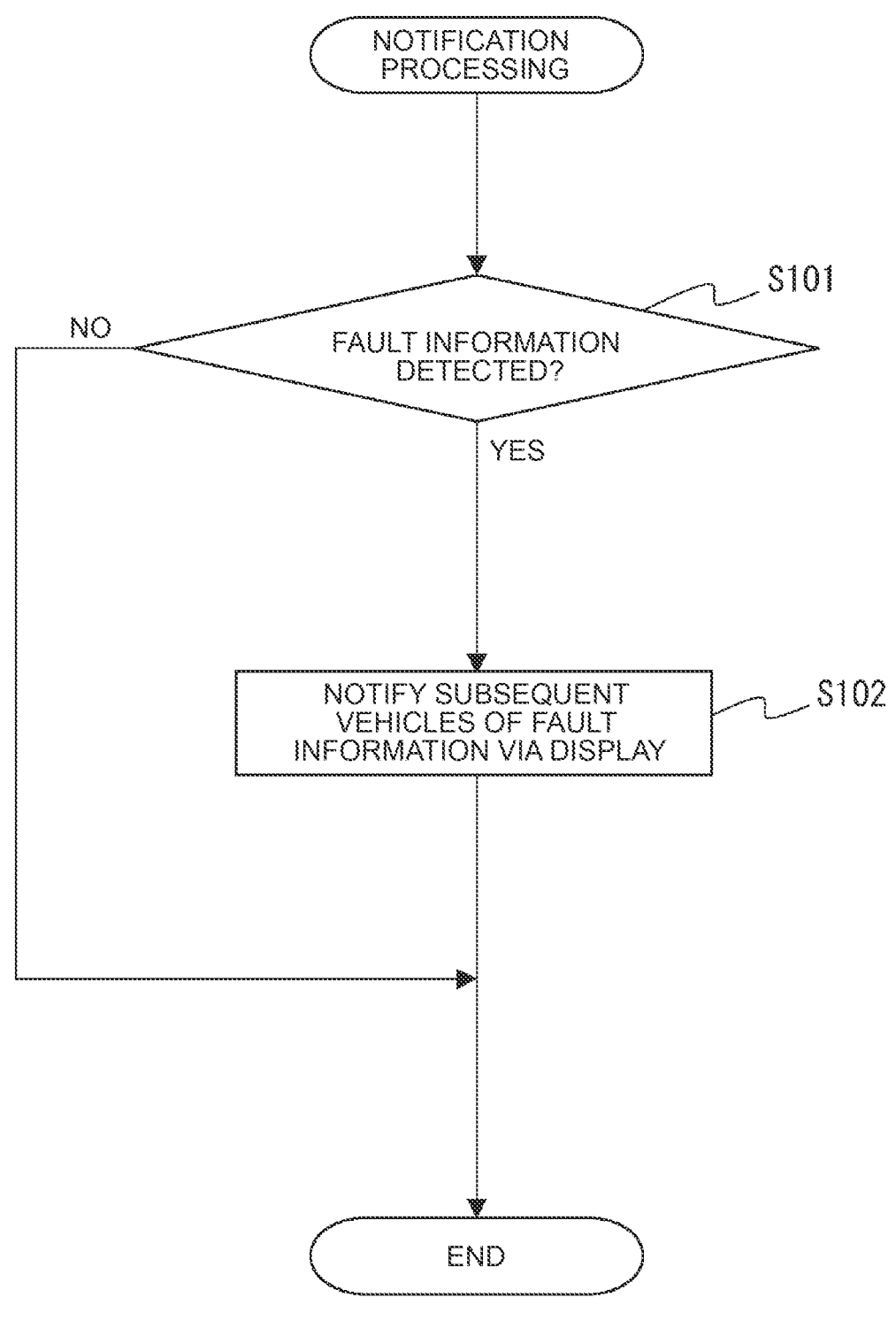
FIG. 4 is a flowchart illustrating a control routine of a notification process according to the first embodiment.

Hereinafter, a processing flow of the above-described control will be described with reference to FIG. 4. FIG. 4 is a flowchart illustrating a control routine of a notification process according to the first embodiment. The control routine is repeatedly executed by the processor 13 of ECU 10 at predetermined runtime intervals.

First, in S101, the notification control unit 15 of the processor 13 determines whether or not failure information is detected by the failure information detection unit 14 of the processor 13. When it is determined that the failure information is not detected, the present control routine ends. On the other hand, if it is determined that the failure data has been detected, the present control routine proceeds to S102.

In S102, the notification control unit 15 notifies the following vehicles 100 of the failure information detected by the failure information detection unit 14 via the display 5. After S102, the control routine ends.

In a case where the vehicle 1 changes the route in accordance with the failure information (for example, a situation as illustrated in FIG. 3), the notification control unit 15 may notify the following vehicle 100 of the change information of the route of the vehicle 1 via the display 5. As a result, the driver of the following vehicle 100 can quickly recognize the change in the behavior of the vehicle 1, and the safety of the following vehicle 100 can be further enhanced.

Further, the notification control unit 15 may determine a recommended operation of the following vehicle 100 based on the failure information, and notify the following vehicle 100 of the recommended operation via the display 5. This allows the driver of the following vehicle 100 to quickly address the hazards posed to the following vehicle 100 by the fault information. For example, as illustrated in FIG. 3, when the falling object present in front of the vehicle 1 is the obstacle information, the notification control unit 15 determines the lane change to the right lane as the recommended operation of the following vehicle 100.

Figure 5:
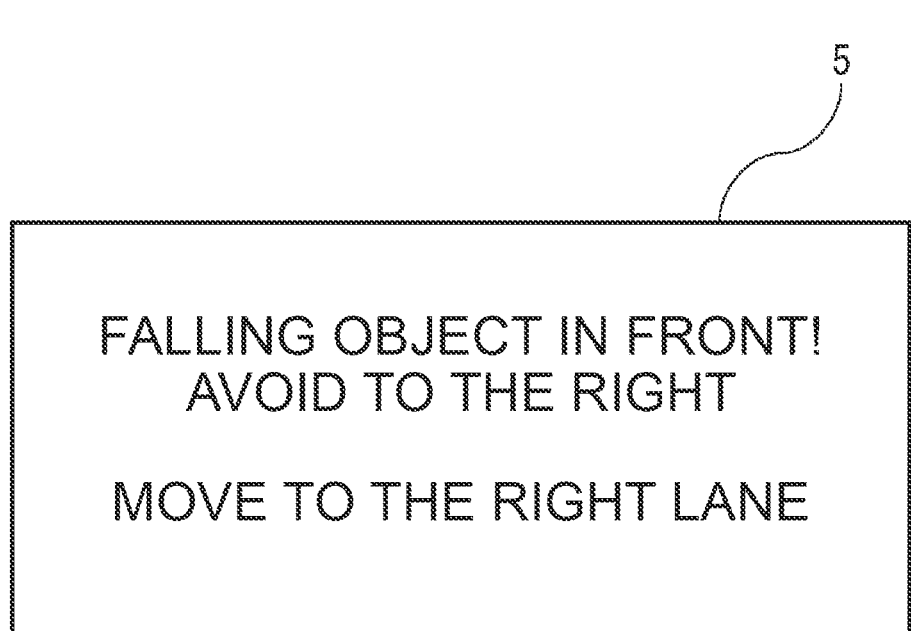
FIG. 5 is a diagram illustrating an example of information displayed on a display for notifying a subsequent vehicle.

FIG. 5 is a diagram illustrating an example of information displayed on the display 5 for notifying the following vehicle 100. In the example of FIG. 5, character information is displayed on the display 5 as information to be notified to the following vehicle 100. Specifically, a falling object present in front of the vehicle 1 is notified to the following vehicle 100 as obstacle information by the letter "falling object in front!". Further, the following vehicle 100 is notified of the change information of the route of the vehicle 1 by the character "avoid right", and the recommended operation of the following vehicle 100 is notified to the following vehicle 100 by the character "move to the right lane".

Note that the notification control unit 15 may notify the following vehicle 100 of the failure information by displaying the image generated by the front-camera 2a provided in the vehicle 1 on the display 5. By displaying the camera image on the display 5 as it is, the driver of the following vehicle 100 can confirm the failure information in front of the vehicle 1 from the viewpoint of the vehicle 1. In this case, the change information of the route of the vehicle 1, the notification of the recommended operation of the following vehicle 100, and the like may be superimposed on the image generated by the front-camera 2a.

In addition, the notification control unit 15 may notify the following vehicle 100 of the behavior information (hereinafter, simply referred to as "behavior information") related to the behavior of the vehicle 1 caused by the failure information, instead of the failure information or in addition to the failure information, via the display 5. That is, in the present embodiment, the notification control unit 15 notifies the following vehicle 100 of at least one of the failure information and the behavior information via the display 5. The behavior information is, for example, information related to braking or steering of the vehicle 1 caused by the failure information.

In addition, the notification control unit 15 may notify the following vehicle 100 of the risk level to be brought to the following vehicle 100 based on the failure information via the display 5. This allows the driver of the following vehicle 100 to intuitively perceive danger.

Figure 6:
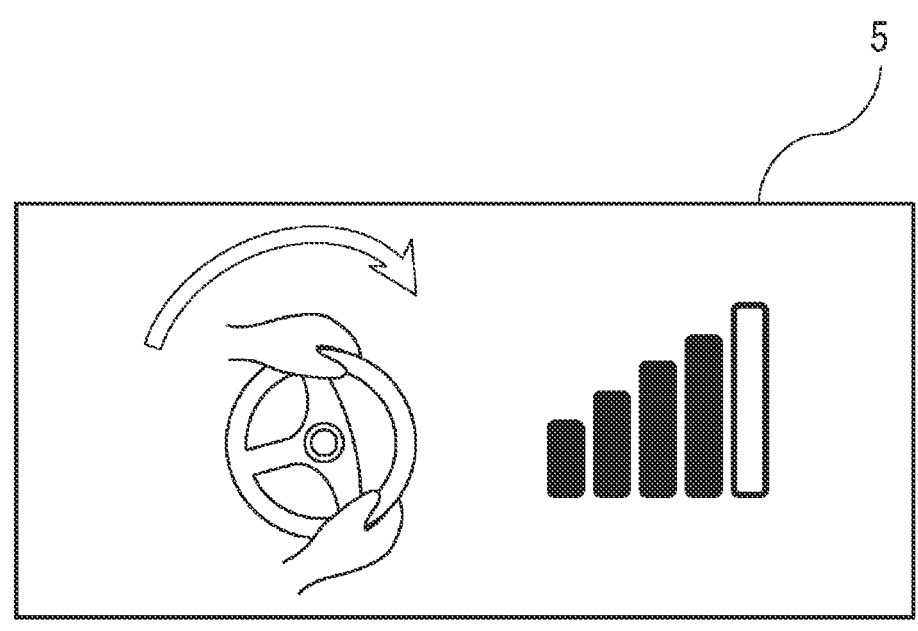
FIG. 6 is a diagram illustrating an example of behavior information and a risk level displayed on a display for notifying a subsequent vehicle.

FIG. 6 is a diagram illustrating an example of the behavior information and the risk level displayed on the display 5 for notifying the following vehicle 100. In the example of FIG. 6, as the behavior information, a steering image indicating the steering to the right of the vehicle 1 and an image of an arrow indicating the steering amount (the length of the arrow indicates the steering amount) are displayed on the display 5. Further, as the risk level, a bar-shaped image indicating the risk level is displayed on the display 5. The bar-shaped image shown in FIG. 6 indicates that the risk level is level 4 among the five levels, and four bars are sequentially lit on the display 5 in descending order of the length of the bars.

Second Embodiment

The information notification device according to the second embodiment is basically the same as the configuration and control of the information notification device according to the first embodiment except for the following points. Therefore, hereinafter, the second embodiment of the present disclosure will be described focusing on the parts different from the first embodiment.

Figure 7:
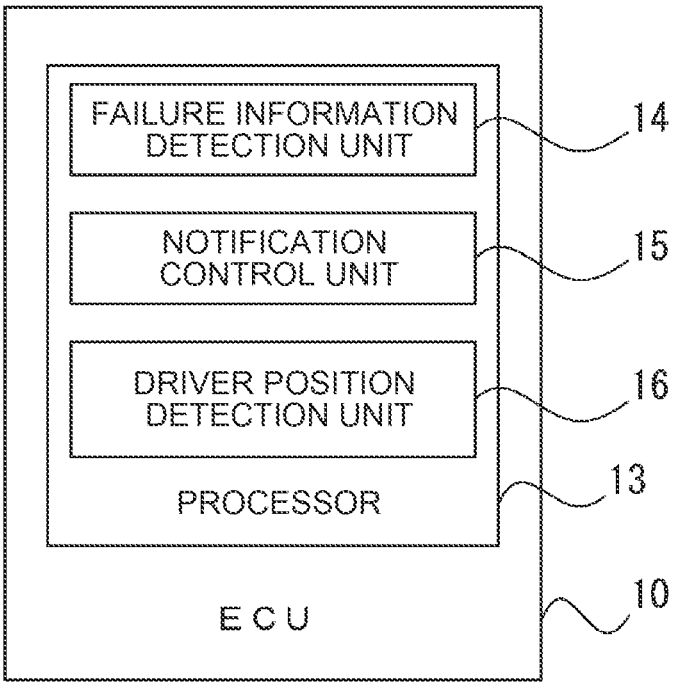
FIG. 7 is a functional diagram of a processor of ECU according to the second embodiment of the present disclosure.

FIG. 7 is a functional diagram of the processor 13 of ECU 10 according to the second embodiment. As illustrated in FIG. 7, in the present embodiment, the processor 13 of ECU 10 includes a driver position detection unit 16 in addition to the failure information detection unit 14 and the notification control unit 15. The failure information detection unit 14, the notification control unit 15, and the driver position detection unit 16 are functional modules realized by ECU 10 processor 13 executing programs stored in the memory 12 of ECU 10. These functional modules may be realized by dedicated arithmetic circuits provided in the processor 13.

The driver position detection unit 16 detects the position of the driver of the following vehicle 100 located behind the vehicle 1. For example, the driver position detection unit 16 detects the position of the driver of the following vehicle 100 based on the peripheral information acquired by the peripheral information acquisition device 2 (for example, a rear camera or a rear rider provided at the rear of the vehicle 1). In this case, the driver position detection unit 16 detects the position of the driver of the following vehicle 100 by detecting the steering or instrument panel of the following vehicle 100 or the driver of the following vehicle 100 using an image recognition technique such as a machine learning model (e.g., a neural network, a support vector machine, a random forest, etc.).

Figure 8:
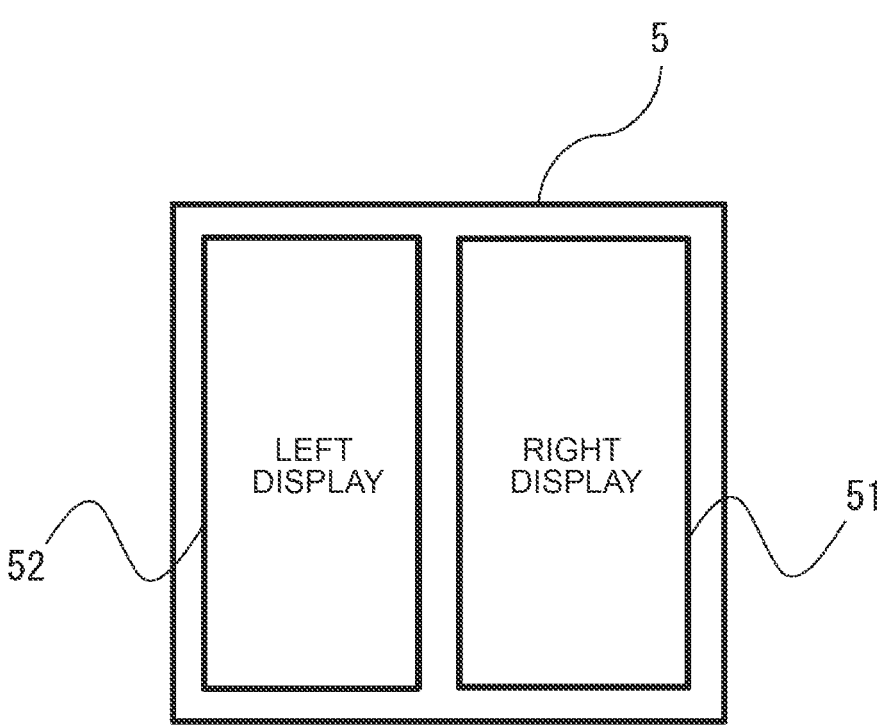
FIG. 8 illustrates an exemplary display having a plurality of displays.
Figure 8:
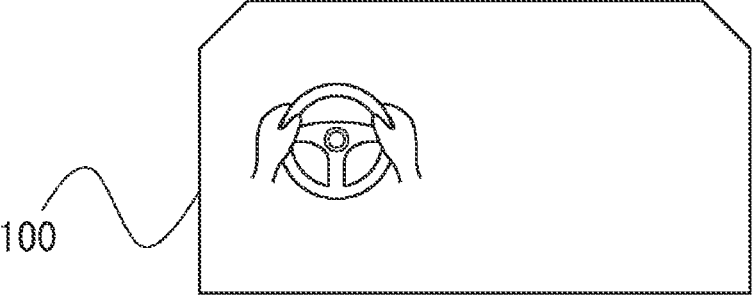

In the second embodiment, the display 5 includes a plurality of display units having different arrangement positions in the vehicle 1. FIG. 8 is a diagram illustrating an example of a display including a plurality of display units. In the example of FIG. 8, the display 5 is divided into two in the left-right direction, and includes a right-side display unit 51 disposed on the right side of the vehicle 1 and a left-side display unit 52 disposed on the left side of the vehicle 1. The right-side display unit 51 and the left-side display unit 52 are electrically connected to ECU 10, and the notification control unit 15 can separately control the display content of the right-side display unit 51 and the display content of the left-side display unit 52.

When the display 5 includes a plurality of display units as shown in FIG. 8, it is desirable that information to be visually recognized by the driver of the following vehicle 100 is displayed on the display unit in front of the driver. Therefore, when notifying the following vehicle 100 of at least one of the failure information and the behavior information, the notification control unit 15 changes the display position of the information on the display 5 in accordance with the position of the driver of the following vehicle 100. As a result, the visibility of the information notified to the following vehicle 100 can be enhanced, and the information can be easily conveyed from the vehicle 1 to the following vehicle 100 when the vehicle 1 is traveling.

When the display 5 includes the right-side display unit 51 and the left-side display unit 52, the driver position detection unit 16 detects the position of the driver of the following vehicle 100 in the left-right direction. The driver position detection unit 16 determines that the position of the driver is right when the steering or the like is detected on the right side of the following vehicle 100, and determines that the position of the driver is left when the steering or the like is detected on the left side of the following vehicle 100. The notification control unit 15 displays at least one of the failure information and the behavior information on the right-side display unit 51 when the position of the driver of the following vehicle 100 is the right, and displays at least one of the failure information and the behavior information on the left-side display unit 52 when the position of the driver of the following vehicle 100 is the left.

On the other hand, the notification control unit 15 turns off the display of the display unit on which the failure information and the behavior information are not displayed. As a result, it is possible to reduce the power consumption of the display 5 while transmitting necessary information to the driver of the following vehicle 100 via the display 5. Note that the notification control unit 15 may display other information such as an advertisement on a display unit on which the failure information and the behavior information are not displayed. For example, as shown in FIG. 8, when the following vehicle 100 is a vehicle with a left steering wheel, that is, when the position of the driver of the following vehicle 100 is the left, the notification control unit 15 may display at least one of the failure information and the behavior information on the left-side display unit 52 and display the advertisement on the right-side display unit 51.

Figure 9:
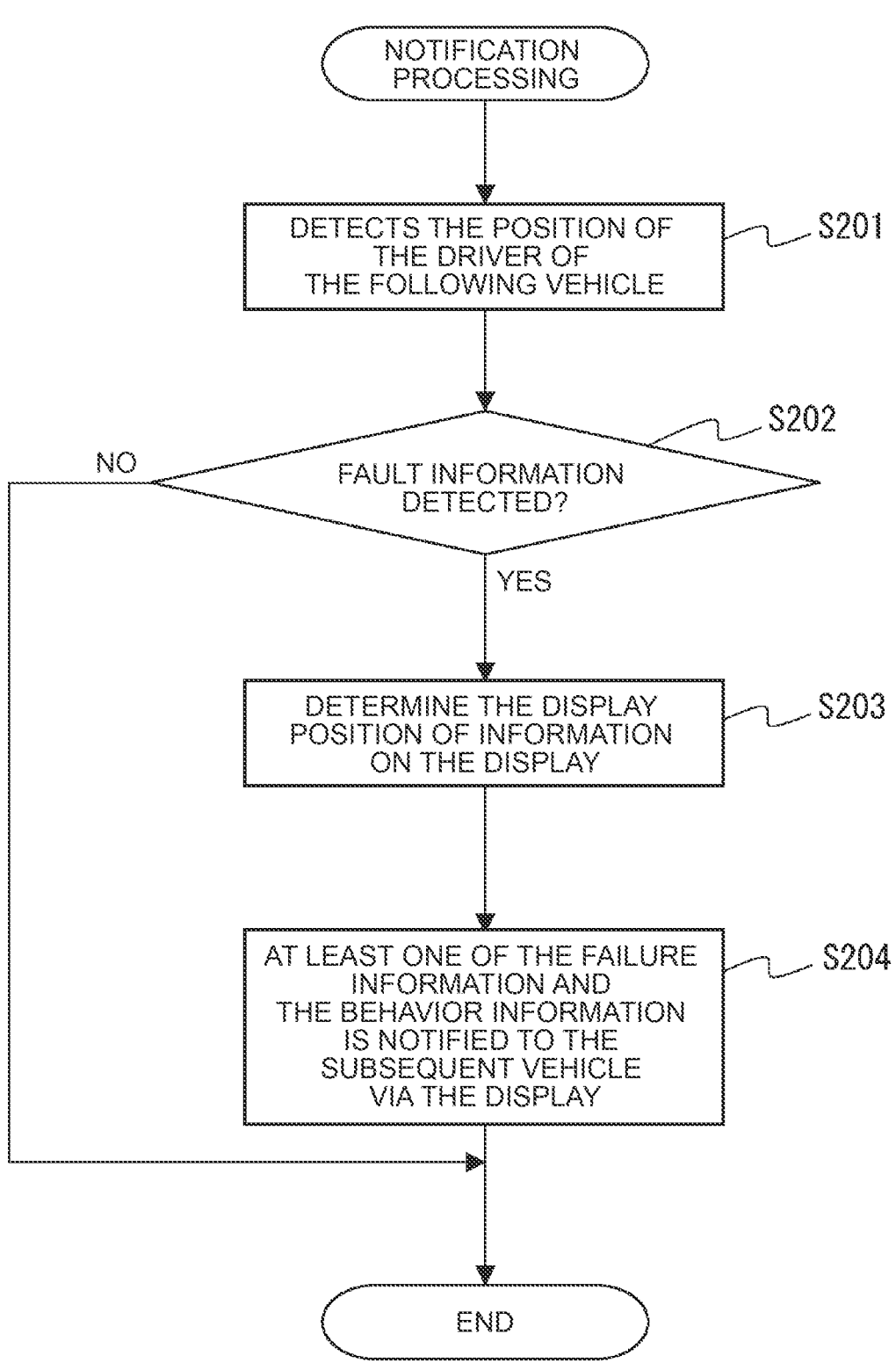
FIG. 9 is a chart showing a control routine of a notification process in the second embodiment.

FIG. 9 is a flowchart illustrating a control routine of a notification process according to the second embodiment. The control routine is repeatedly executed by the processor 13 of ECU 10 at predetermined runtime intervals.

First, in S201, the driver position detection unit 16 of the processor 13 detects the position of the driver of the following vehicles 100.

Next, in S202, the notification control unit 15 of the processor 13 determines whether or not failure information is detected by the failure information detection unit 14 of the processor 13. When it is determined that the failure information is not detected, the present control routine ends. On the other hand, if it is determined that the failure data has been detected, the present control routine proceeds to S203.

In S203, the notification control unit 15 determines the display position of the information on the display 5 based on the position of the driver detected by the driver position detection unit 16. For example, when the position of the driver of the following vehicle 100 is the right, the notification control unit 15 determines the display position of the information on the right-side display unit 51 of the display 5. On the other hand, when the position of the driver of the following vehicle 100 is the left, the notification control unit 15 determines the display position of the information on the left-side display unit 52 of the display 5.

Next, in S204, the notification control unit 15 notifies the following vehicles 100 of at least one of the failure information and the behavior information via the display 5. At this time, for example, when the display position of the information determined in S203 is the right-side display unit 51, the notification control unit 15 displays at least one of the failure information and the behavior information on the right-side display unit 51, and turns off the display of the left-side display unit 52. In this case, the notification control unit 15 may display other information such as an advertisement on the left-side display unit 52. After S204, the control routine ends. Note that S201 may be executed between S202 and S203.

Further, the display 5 may be divided into two parts in the up-down direction, and may have an upper display part arranged on the upper side of the vehicle 1 and a lower display part arranged on the lower side of the vehicle 1. In this case, the driver position detection unit 16 detects the position of the driver of the following vehicle 100 in the vertical direction, for example, based on the vehicle height of the following vehicle 100. The notification control unit 15 determines that the position of the driver is up when the vehicle height of the following vehicle 100 is equal to or higher than the predetermined value, and determines that the position of the driver is down when the vehicle height of the following vehicle 100 is lower than the predetermined value. The vehicle height of the following vehicle 100 is detected based on the surrounding information acquired by the peripheral information acquisition device 2, or is acquired through inter-vehicle communication between the vehicle 1 and the following vehicle 100.

Similarly to the left-right position of the driver, the driver position detection unit 16 may detect the position of the driver of the following vehicle 100 by detecting the steering or instrument panel of the following vehicle 100 or the driver of the following vehicle 100 using an image recognition technique such as a machine learning model (for example, a neural network, a support vector machine, a random forest, or the like). The notification control unit 15 displays information on the upper display unit when the position of the driver of the following vehicle 100 is up, and displays information on the lower display unit when the position of the driver of the following vehicle 100 is down. Also in this case, the display unit in which the failure information and the behavior information are not displayed is turned off or other information such as an advertisement is displayed.

Further, the display 5 may be divided into four parts in the up-down direction and the left-right direction, and may have an upper right display part arranged on the upper right side of the vehicle 1, a lower right display part arranged on the lower right side of the vehicle 1, an upper left display part arranged on the upper left side of the vehicle 1, and a lower left display part arranged on the lower left side of the vehicle 1. In this case, the driver position detection unit 16 detects the position of the driver of the following vehicle 100 in the left-right direction and the up-down direction by the above-described method. The notification control unit 15 displays the information on the upper right side display unit when the position of the driver of the following vehicle 100 is the upper right, displays the information on the lower right side display unit when the position of the driver of the following vehicle 100 is the lower right, displays the information on the upper left side display unit when the position of the driver of the following vehicle 100 is the upper left, and displays the information on the lower left side display unit when the position of the driver of the following vehicle 100 is the lower left. Also in this case, the display unit in which the failure information and the behavior information are not displayed is turned off or other information such as an advertisement is displayed.

The notification control unit 15 may increase the number of display units of the display 5 on which at least one of the failure information and the behavior information is displayed as compared with the case where the risk level is low when the risk level brought to the following vehicle 100 based on the failure information is high. For example, the notification control unit 15 displays at least one of the information of the disorder information and behavior information in the display 5, regardless of the location of the driver in the following vehicle 100, when the risk level is at least a predetermined value or higher. This allows the following vehicle 100 to be notified of the hazard with an appropriate strength according to the risk level. For example, the notification control unit 15 calculates a Time To Collision (TTC) between the following vehicle 100 and the vehicle 1, and calculates a risk-level based on TTC. The shorter TTC, the higher the risk-level.

OTHER EMBODIMENTS

While preferred embodiments of the present disclosure have been described above, the present disclosure is not limited to these embodiments, and various modifications and changes can be made. For example, information other than the failure information and the behavior information (for example, an advertisement or the like) may be displayed on the display 5 for presentation to the driver of the following vehicle 100, and the notification control unit 15 may change the display position of the information on the display 5 in accordance with the position of the driver of the following vehicle 100.

In addition to the notification to the following vehicle 100, the notification control unit 15 may transmit the failure information to a facility (for example, a road traffic information center, a police station, an information management server, or the like) outside the vehicle 1 via road-to-vehicle communication or wide area wireless communication. This makes it possible to efficiently aggregate failure information found in various places via the vehicle.

In a case where a plurality of following vehicles exists behind the vehicle 1, the information may be sequentially transmitted from the leading following vehicle to the trailing vehicle at the trailing end. In this case, when the information is notified from the vehicle ahead, the following vehicle notifies the same information to the vehicle further behind the host vehicle. At this time, when the following vehicle has a display device such as the display 5, the information is notified via the display device, and when the following vehicle does not have a display device such as the display 5, the information is notified via the inter-vehicle communication.

In addition, a computer program that causes a computer to realize the functions of the respective units included in the processor 13 of ECU 10 may be provided in a form stored in a computer-readable recording medium. The computer-readable recording medium is, for example, a magnetic recording medium, an optical recording medium, or a semiconductor memory.

In addition, a display control device including a processor and a memory may be attached to the vehicle 1 together with the display 5, and such a display control device may function as an information notification device to execute the above-described information notification method. In addition, a server or a control center capable of communicating with the vehicle 1 via wide area wireless communication such as a communication network may function as an information notification device and execute the information notification method as described above.

11

What is claimed is:

1. An information notification device configured to be mounted on a host vehicle, comprising a processor configured to:

detect a position of a driver of a following vehicle located behind the host vehicle using image recognition with a first neural network based on information acquired from a rear camera of the host vehicle;

detect failure information that affects travel of the host vehicle while the host vehicle is traveling using image recognition with a second neural network based on information acquired from a front camera of the host vehicle; and control a plurality of displays positioned at different locations on a rear part of the host vehicle to display the failure information by showing an image generated by the front camera that includes the failure information, with behavior information and recommendation information superimposed on the image, the behavior information indicating behavior of the host vehicle due to the failure information, and the recommendation information indicating an operation that the driver of the following vehicle is recommended to take, wherein the processor is further configured to change which of the plurality of displays shows the image based on the detected position of the driver of the following vehicle.

2. The information notification device according to claim 1, wherein the processor is further configured to, in a case where a level of a risk caused to the following vehicle based on the failure information is high, control the plurality of displays such that more displays display the failure information compared to a case where the level of the risk is low.

3. The information notification device according to claim 2, wherein the processor is further configured to, in a case where the level of the risk is higher than a predetermined value, control the plurality of displays such that all displays display the failure information.

4. The information notification device according to claim 2, wherein the processor is further configured to calculate a time to collision (TTC) between the following vehicle and the host vehicle, and calculate the level of the risk based on the TTC, wherein the level of the risk increases as the TTC decreases.

5. The information notification device according to claim 1, wherein the plurality of displays includes a right display located on a right side of the host vehicle and a left display located on a left side of the host vehicle, and the processor is further configured to:

detect whether the position of the driver of the following vehicle is on a right side or a left side of the following vehicle;

control the right display to display the failure information in response to determining that the driver of the following vehicle is on the right side of the following vehicle; and control the left display to display the failure information in response to determining that the driver of the following vehicle is on the left side of the following vehicle.

6. The information notification device according to claim 5, wherein the processor is further configured to control the right display to display the failure information and the left display to display an advertisement in response to determining that the driver of the following vehicle is on the right side of the following vehicle; and control the left display to display the failure information and the right display to display an advertisement in response to determining that the driver of the following vehicle is on the left side of the following vehicle.

7. The information notification device according to claim 1, wherein the plurality of displays includes an upper display and a lower display located below the upper display, and the processor is further configured to:

detect whether the position of the driver of the following vehicle is equal to or above a predetermined height;

control the upper display to display the failure information in a case where the position of the driver of the following vehicle is equal to or above the predetermined height; and control the lower display to display the failure information in a case where the position of the driver of the following vehicle is below the predetermined height.

8. The information notification device according to claim 1, wherein the failure information indicates presence of an object in front of the host vehicle, a construction, or lane restriction, the behavior information indicates a braking or steering operation is performed on the host vehicle, and the recommendation information indicates texts to prompt the driver of the following vehicle to change lanes.

9. The information notification device according to claim 1, wherein the processor is further configured to transmit the failure information to a facility outside the host vehicle.

10. An information notification method to be executed by a computer mounted on a host vehicle, the information notification method comprising:

detecting a position of a driver of a following vehicle located behind the host vehicle using image recognition with a first neural network based on information acquired from a rear camera of the host vehicle;

detecting failure information that affects travel of the host vehicle while the host vehicle is traveling using image recognition with a second neural network based on information acquired from a front camera of the host vehicle;

controlling a plurality of displays positioned at different locations on a rear part of the host vehicle to display the failure information by showing an image generated by the front camera that includes the failure information, with behavior information and recommendation information superimposed on the image, the behavior information indicating behavior of the host vehicle due to the failure information, and the recommendation information indicating an operation that the driver of the following vehicle is recommended to take; and changing which of the plurality of displays shows the image based on the detected position of the driver of the following vehicle.

* * * * *